(12) United States Patent
Yokawa et al.

(10) Patent No.: US 8,970,793 B2
(45) Date of Patent: Mar. 3, 2015

(54) DISPLAY DEVICE, AND TELEVISION DEVICE

(75) Inventors: Akira Yokawa, Daito (JP); Yasuyuki Fukumoto, Daito (JP); Yasuhiro Mori, Daito (JP); Takahito Yamanaka, Daito (JP); Yuki Kita, Daito (JP); Akihiro Fujikawa, Daito (JP); Yuto Suzuki, Daito (JP); Hirofumi Horiuchi, Daito (JP); Hirohiko Tsuji, Daito (JP); Hideo Yonezawa, Daito (JP)

(73) Assignee: Funai Electric Co., Ltd., Daito-shi (JP)

(*) Notice: Subject to any disclaimer, the term of this patent is extended or adjusted under 35 U.S.C. 154(b) by 0 days.

(21) Appl. No.: 14/239,962

(22) PCT Filed: Aug. 28, 2012

(86) PCT No.: PCT/JP2012/071731
§ 371 (c)(1),
(2), (4) Date: Feb. 20, 2014

(87) PCT Pub. No.: WO2013/031781
PCT Pub. Date: Mar. 7, 2013

(65) Prior Publication Data
US 2014/0184928 A1 Jul. 3, 2014

(30) Foreign Application Priority Data

Aug. 30, 2011 (JP) .................... 2011-187156
Aug. 30, 2011 (JP) .................... 2011-187358
Aug. 9, 2012 (JP) .................... 2012-177040

(51) Int. Cl.
H04N 5/64 (2006.01)
H04N 5/44 (2011.01)
(Continued)

(52) U.S. Cl.
CPC .......... G02F 1/133308 (2013.01); H04N 5/655 (2013.01); H04R 1/028 (2013.01); G02F 2001/133314 (2013.01); G02F 2001/13332 (2013.01)
USPC ............... 348/794; 348/553; 349/61; 349/58; 349/153; 362/97.1; 362/633

(58) Field of Classification Search
None
See application file for complete search history.

(56) References Cited

U.S. PATENT DOCUMENTS 6,259,505 B1 * 7/2001 Makino .................... 349/153
6,894,757 B2 5/2005 Ha et al.
(Continued)

FOREIGN PATENT DOCUMENTS

EP 2 354 836 A1 8/2011
JP 11-337937 A 12/1999
(Continued)

OTHER PUBLICATIONS
International Search Report (PCT/ISA/210) with English translation dated Nov. 20, 2012 (Five (5) pages).
(Continued)

Primary Examiner — Jefferey Harold
Assistant Examiner — Sean Haiem
(74) Attorney, Agent, or Firm — Crowell & Moring LLP

(57) ABSTRACT

This display device (100) includes a display panel (2) including a substrate mounting member (5) covering a backlight source (4b) and a cover member (6) arranged to partially cover the rear surface of the substrate mounting member and to expose a region in the periphery of at least an outer peripheral portion (51) of the rear surface of the substrate mounting member. The substrate mounting member has a side surface portion (51a, 51b, 51c, 51d), while a corner portion (51e, 51f, 51g, 51h) of the outer peripheral portion formed by the side surface portion of the substrate mounting member has such a shape that adjacent ones of the side surface portion are bonded to each other without a clearance.

19 Claims, 12 Drawing Sheets

(51) Int. Cl.
  *G02F 1/1335* (2006.01)
  *G02F 1/1333* (2006.01)
  *G02F 1/1339* (2006.01)
  *G09F 13/04* (2006.01)
  *G09F 13/08* (2006.01)
  *F21V 7/04* (2006.01)
  *H04N 5/655* (2006.01)
  *H04R 1/02* (2006.01)

(56) References Cited

U.S. PATENT DOCUMENTS

| | | | |
|---|---|---|---|
| 7,098,984 | B2 | 8/2006 | Ha et al. |
| 7,248,327 | B2 | 7/2007 | Ha et al. |
| 7,798,701 | B2 | 9/2010 | Mori et al. |
| RE44,008 | E * | 2/2013 | Sugahara et al. ............ 362/633 |
| 2004/0114062 | A1 * | 6/2004 | Nishio et al. .................... 349/58 |
| 2006/0146223 | A1 | 7/2006 | Iwai et al. |
| 2008/0084658 | A1 | 4/2008 | Matsuda et al. |
| 2009/0004408 | A1 | 1/2009 | Nakanishi et al. |
| 2009/0147175 | A1 * | 6/2009 | Tsumura et al. ............... 349/58 |
| 2010/0020533 | A1 * | 1/2010 | Kamada ....................... 362/97.1 |
| 2010/0231804 | A1 | 9/2010 | Hisakawa |
| 2010/0253874 | A1 | 10/2010 | Ito et al. |
| 2011/0141389 | A1 | 6/2011 | Tabor |
| 2012/0086884 | A1 * | 4/2012 | Yoshikawa ..................... 349/61 |
| 2012/0236204 | A1 * | 9/2012 | Kasai ............................. 348/553 |

FOREIGN PATENT DOCUMENTS

| | | |
|---|---|---|
| JP | 2001-109390 A | 4/2001 |
| JP | 2002-333606 A | 11/2002 |
| JP | 2003-029649 A | 1/2003 |
| JP | 2007-065229 A | 3/2007 |
| JP | 2007-171459 A | 7/2007 |
| JP | 2007-334244 A | 12/2007 |
| JP | 2008-090193 A | 4/2008 |
| JP | 2009-003081 A | 1/2009 |
| JP | 2009-031756 A | 2/2009 |
| JP | 2009-139704 A | 6/2009 |
| JP | 2009-186831 A | 8/2009 |
| JP | 2010-118234 A | 5/2010 |
| JP | 2010-239249 A | 10/2010 |
| JP | 2011-008026 A | 1/2011 |
| JP | 2011-129465 A | 6/2011 |
| WO | WO 2009/054177 A1 | 4/2009 |

OTHER PUBLICATIONS

Japanese Written Opinion (PCT/ISA/237) dated Nov. 20, 2012 (Seven (7) pages).

* cited by examiner

DISPLAY DEVICE, AND TELEVISION DEVICE

TECHNICAL FIELD

The present invention relates to a display device and a television device, and more particularly, it relates to a display device and a television device each including a display panel including a backlight source.

BACKGROUND ART

A display device and a television device each including a display panel including a backlight source are known in general. Such a display device and a television device are disclosed in National Patent Publication Gazette No. 2009-054177, for example.

In National Patent Publication Gazette No. 2009-054177, there is disclosed a television receiving device including a front cabinet on a front side, a rear cabinet on a rear side, and a liquid crystal display device stored in a state held between the front cabinet and the rear cabinet. This liquid crystal display device includes a bezel on the front side, a liquid crystal panel, and a backlight device on the rear side. The backlight device has a frame and a chassis on which a plurality of LED light sources emitting light toward the front side (display side) are arranged. Each of the bezel, the frame and the chassis is formed in a rectangular shape having four side surface portions, while the LED light sources are arranged on a region surrounded by the side surface portions of the respective ones of the bezel, the frame and the chassis. According to National Patent Publication Gazette No. 2009-054177, clearances are formed on corner portions of outer peripheral portions of the respective ones of the bezel, the frame and the chassis.

PRIOR ART

Patent Document

Patent Document 1: National Patent Publication Gazette No. 2009-054177

SUMMARY OF THE INVENTION

Problem to be Solved by the Invention

In the television receiving device described in National Patent Publication Gazette No. 2009-054177, however, the clearances are formed on the corner portions of the outer peripheral portions of the respective ones of the bezel, the frame and the chassis, and hence there is such a problem that the light from the LED light sources leaks out of the liquid crystal display device through clearances on respective ones of corner portions of the liquid crystal display device.

The present invention has been proposed in order to solve the aforementioned problem, and one object of the present invention is to provide a display device and a television device each capable of inhibiting light of a backlight source from leaking outward through a corner portion.

Means for Solving the Problem

A display device according to a first aspect of the present invention includes a display panel including a backlight source and a substrate mounting member covering the backlight source and a cover member arranged to partially cover the rear surface of the substrate mounting member and to expose a region in the periphery of at least an outer peripheral portion of the rear surface of the substrate mounting member, and the substrate mounting member has a bottom surface portion and a side surface portion, while a corner portion of the outer peripheral portion formed by the side surface portion of the substrate mounting member has such a shape that adjacent ones of the side surface portion are bonded to each other without a clearance.

In the display device according to the first aspect of the present invention, as hereinabove described, the corner portion of the outer peripheral portion formed by the side surface portion of the substrate mounting member has such a shape that adjacent ones of the side surface portion are bonded to each other without a clearance, whereby light from the backlight source covered with the substrate mounting member can be inhibited from leaking outward through the corner portion of the substrate mounting member. Particularly, also in the case where the cover member is arranged to expose the periphery of the outer peripheral portion of the substrate mounting member of the display panel as in the present invention, the light of the backlight source can be reliably inhibited from leaking out of the display device through the corner portion of the exposed outer peripheral portion, due to the corner portion of the substrate mounting member having no clearance. Further, the periphery of the outer peripheral portion of the substrate mounting member exposed from the cover member can be easily used as a rear housing by suppressing outward light leakage from the corner portion of the outer peripheral portion of the substrate mounting member.

Preferably in the aforementioned display device according to the first aspect, an outer peripheral surface of the side surface portion on the corner portion of the substrate mounting member is so formed that adjacent ones of the side surface portion are bonded to each other without a clearance to have a round shape. When structured in this manner, a member other than the substrate mounting member can be inhibited from coming into contact with the corner portion and being damaged dissimilarly to a case where the outer peripheral surface of the corner portion has an angular shape, due to the corner portion of the round shape, while suppressing outward light leakage from the corner portion.

Preferably in this case, a rear housing is constituted of the substrate mounting member, and the display device further includes a frame-shaped front housing having an inner peripheral surface approachingly opposed to the outer peripheral surface of the side surface portion of the substrate mounting member. When structured in this manner, the outer peripheral surface of the side surface portion of the substrate mounting member serving also as the rear housing can be covered with the inner peripheral surface of the front housing, whereby the light from the backlight source can be more reliably inhibited from leaking outward through the outer peripheral surface of the side surface portion of the substrate mounting member. Further, the inner peripheral surface of the front housing arranged to approach the corner portion can be inhibited from coming into contact with the corner portion and being damaged dissimilarly to a case where the outer peripheral surface of the side surface portion on the corner portion has an angular shape, due to the corner portion of the round shape.

Preferably in the aforementioned display device including the front housing, the front housing includes a light shielding portion formed on a position inward beyond the corner portion of the substrate mounting member to protrude toward the rear surface side. When structured in this manner, the light of the backlight source can be effectively inhibited from leaking out of the display device through the corner portion of the substrate mounting member, due to the light shielding portion.

Preferably in the aforementioned display device according to the first aspect, the substrate mounting member is made of metal, and the exposed region of the bottom surface portion of the substrate mounting member in the periphery of the outer peripheral portion has a convex shape swelling toward the rear surface side. When structured in this manner, mechanical strength in the periphery of the peripheral portion of the substrate mounting member made of metal can be improved due to the convex shape swelling toward the rear surface side, whereby mechanical strength necessary as the rear housing can be sufficiently ensured also in a case of employing the periphery of the outer peripheral portion of the substrate mounting member exposed from the cover member as the rear housing.

Preferably in the aforementioned display device according to the first aspect, a region of the bottom surface portion of the substrate mounting member covered with the cover member of the substrate mounting member is formed in a concave shape, and the cover member is mounted to fit into the region of the concave shape. When structured in this manner, the height of the region of the substrate mounting member covered with the cover member decreases due to the formation in the concave shape dissimilarly to a case where the region of the substrate mounting member covered with the cover member is formed in a planar surface shape, whereby the thickness of the whole device can be reduced.

Preferably, the aforementioned display device according to the first aspect further includes a circuit board mounted on the rear surface of the substrate mounting member, the cover member is arranged to cover the circuit board mounted on the rear surface of the substrate mounting member and to expose a region in the periphery of the outer peripheral portion of the rear surface of the substrate mounting member, the substrate mounting member is made of metal, and the exposed region in the periphery of the outer peripheral portion of the substrate mounting member functions as a heat radiation portion radiating heat of at least the circuit board mounted on the substrate mounting member outward. When structured in this manner, the light of the backlight source can be reliably inhibited from leaking out of the display device through the corner portion of the exposed outer peripheral portion while efficiently radiating the heat from the circuit board mounted on the substrate mounting member made of metal from the exposed region in the periphery of the outer peripheral portion of the substrate mounting member.

Preferably in this case, the display device further includes a speaker, and the cover member is arranged to also cover the speaker in addition to the circuit board. When structured in this manner, no member for covering the speaker may be separately provided, whereby the number of components can be reduced.

Preferably in the aforementioned display device according to the first aspect, the substrate mounting member of the display panel has a substrate mounting region on the rear surface and has a heat radiation function, the display device further includes a circuit board mounted on the substrate mounting region on the rear surface of the substrate mounting member, the cover member is arranged to cover the substrate mounting region mounted with the circuit board from behind and to expose a non-substrate-mounting region other than the substrate mounting region on the rear surface of the substrate mounting member, and a rear housing is constituted of at least the exposed non-substrate-mounting region of the substrate mounting member. When structured in this manner, the circuit board mounted on the substrate mounting region of the substrate mounting member can be directly covered with the cover member, whereby no member other than the cover member may be separately provided so that the number of components can be inhibited from increasing. Further, heat generated from the circuit board can be efficiently radiated outward from the exposed non-substrate-mounting region of the substrate mounting member, dissimilarly to a case of covering both of the substrate mounting region and the non-substrate-mounting region of the substrate mounting member with the cover member. In addition, the rear housing is constituted of at least the exposed non-substrate-mounting region of the substrate mounting member, whereby no rear housing may be separately provided also in a case of arranging the cover member to cover only part (substrate mounting region) of the substrate mounting member.

Preferably in this case, the circuit board has an external connection terminal, and the cover member arranged to cover the substrate mounting region and to expose the non-substrate-mounting region has an opening exposing the external connection terminal of the circuit board. When structured in this manner, the external connection terminal of the circuit board can be easily connected with a connection wire of an externally set electronic apparatus or the like through the opening of the cover member.

Preferably in the aforementioned structure in which the cover member covers the substrate mounting region from behind, the substrate mounting member constituting the rear housing is made of metal, and the exposed non-substrate-mounting region of the substrate mounting member functions as a heat radiation portion radiating heat of at least the circuit board mounted on the substrate mounting region outward. When structured in this manner, heat is more easily transferred as compared with a case where the substrate mounting member constituting the rear housing is made of resin, for example, whereby the heat generated from the circuit board can be more efficiently radiated outward.

Preferably in the aforementioned structure in which the cover member covers the substrate mounting region from behind, the cover member has a recess portion storing the circuit board, and the circuit board mounted on the substrate mounting region on the rear surface of the substrate mounting member is covered with the cover member in a state stored in the recess portion of the cover member. When structured in this manner, the circuit board protruding rearward can be easily stored due to the recess portion of the cover member also in a case where the circuit board is mounted on the rear surface of the substrate mounting member to protrude rearward, whereby the whole circuit board can be easily covered with the cover member.

Preferably in the aforementioned structure in which the cover member covers the substrate mounting region from behind, the non-substrate-mounting region on the rear surface of the substrate mounting member is provided on the rear surface of the substrate mounting member to surround the periphery of the substrate mounting region. When structured in this manner, the area of the exposed region effective for heat radiation can be enlarged due to the non-substrate-mounting region exposed to surround the periphery of the substrate mounting region of the substrate mounting member, whereby the heat generated from the circuit board mounted on the substrate mounting region of the substrate mounting member can be more effectively radiated.

Preferably in the aforementioned structure in which the cover member covers the substrate mounting region from behind, the substrate mounting region on the rear surface of the substrate mounting member is formed in a concave shape, and the cover member is mounted to fit into the substrate mounting region of the concave shape. When structured in this manner, the substrate mounting region of the substrate mounting member is so formed in the concave shape that the thickness of the whole device can be reduced, dissimilarly to a case where the substrate mounting region of the substrate mounting member is formed in a planar surface shape.

Preferably in the aforementioned structure in which the cover member covers the substrate mounting region from behind, the display device further includes a frame-shaped front housing having an inner peripheral surface approaching an outer peripheral surface of the substrate mounting member constituting the rear housing and covering the periphery of the outer peripheral surface. When structured in this manner, the front housing and the rear housing (substrate mounting member) can be easily formed in corresponding shapes by approaching the inner peripheral surface of the front housing to the outer peripheral surface of the substrate mounting member constituting the rear housing.

Preferably in the aforementioned structure in which the cover member covers the substrate mounting region from behind, the display device further includes a speaker, and the cover member is arranged to also cover the speaker in addition to the circuit board while exposing the non-substrate-mounting region. When structured in this manner, no member for covering the speaker may be separately provided, whereby increase in number of components can be suppressed.

Preferably in the aforementioned structure in which the cover member covers the substrate mounting region from behind, the cover member is configured to be mountable on the display panel of a different size in a common magnitude. When structured in this manner, no cover member of a different size may be formed to be mounted on a display panel of a different size, whereby manufacturing steps for the cover member can be simplified.

A television device according to a second aspect of the present invention includes a receiving portion capable of receiving television broadcasting, a display panel including a backlight source and a substrate mounting member covering the backlight source and capable of displaying television broadcasting and a cover member arranged to partially cover the rear surface of the substrate mounting member and to expose a region in the periphery of at least an outer peripheral portion of the rear surface of the substrate mounting member, and the substrate mounting member has a bottom surface portion and a side surface portion, while a corner portion of the outer peripheral portion formed by the side surface portion of the substrate mounting member has such a shape that adjacent ones of the side surface portion are bonded to each other without a clearance.

In the television device according to the second aspect of the present invention, as hereinabove described, the corner portion of the outer peripheral portion formed by the side surface portion of the substrate mounting member has such a shape that adjacent ones of the side surface portion are bonded to each other without a clearance, whereby light from the backlight source covered with the substrate mounting member can be inhibited from leaking outward through the corner portion of the substrate mounting member. Particularly, also in the case where the cover member is arranged to expose the periphery of the outer peripheral portion of the substrate mounting member of the display panel as in the present invention, the light of the backlight source can be reliably inhibited from leaking out of the television device through the corner portion of the exposed outer peripheral portion, due to the corner portion of the substrate mounting member having no clearance. Further, the periphery of the outer peripheral portion of the substrate mounting member exposed from the cover member can be easily used as a rear housing by suppressing outward light leakage from the corner portion of the outer peripheral portion of the substrate mounting member.

Preferably in the aforementioned television device according to the second aspect, an outer peripheral surface of the side surface portion on the corner portion of the substrate mounting member is so formed that adjacent ones of the side surface portion are bonded to each other without a clearance to have a round shape. When structured in this manner, a member other than the substrate mounting member can be inhibited from coming into contact with the corner portion and being damaged dissimilarly to a case where the outer peripheral portion of the corner portion has an angular shape, due to the corner portion of the round shape.

Preferably in the aforementioned television device according to the second aspect, the substrate mounting member of the display panel has a substrate mounting region on the rear surface and has a heat radiation function, the television device further includes a circuit board mounted on the substrate mounting region on the rear surface of the substrate mounting member, the cover member is arranged to cover the substrate mounting region mounted with the circuit board from behind and to expose a non-substrate-mounting region other than the substrate mounting region on the rear surface of the substrate mounting member, and a rear housing is constituted of at least the exposed non-substrate-mounting region of the substrate mounting member. When structured in this manner, the circuit board mounted on the substrate mounting region of the substrate mounting member can be directly covered with the cover member, whereby no member other than the cover member may be separately provided so that the number of components can be inhibited from increasing. Further, heat generated from the circuit board can be efficiently radiated outward from the exposed non-substrate-mounting region of the substrate mounting member, dissimilarly to a case of covering both of the substrate mounting region and the non-substrate-mounting region of the substrate mounting member with the cover member. In addition, the rear housing is constituted of at least the exposed non-substrate-mounting region of the substrate mounting member, whereby no rear housing may be separately provided also in a case of arranging the cover member to cover only part (substrate mounting region) of the substrate mounting member.

Effect of the Invention

According to the present invention, as hereinabove described, the light of the backlight source can be inhibited from leaking outward through the corner portion.

MODES FOR CARRYING OUT THE INVENTION

An embodiment embodying the present invention is now described on the basis of the drawings.

The structure of a liquid crystal television device 100 according to the embodiment of the present invention is described with reference to FIGS. 1 to 19. The liquid crystal television device 100 is an example of the "display device" and the "television device" in the present invention.

Figure 1:
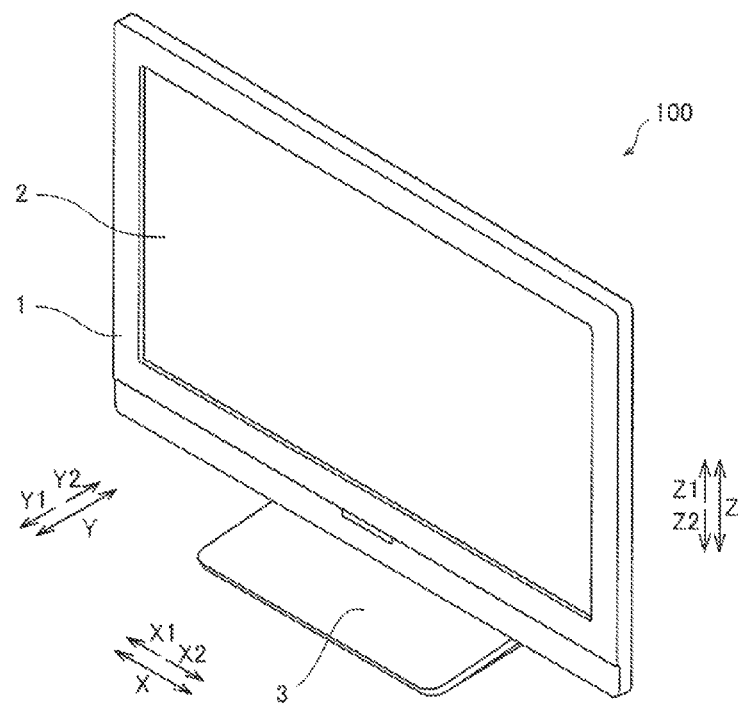
[FIG. 1] An overall perspective view of a liquid crystal television device according to an embodiment of the present invention as viewed from a front side.
Figure 2:
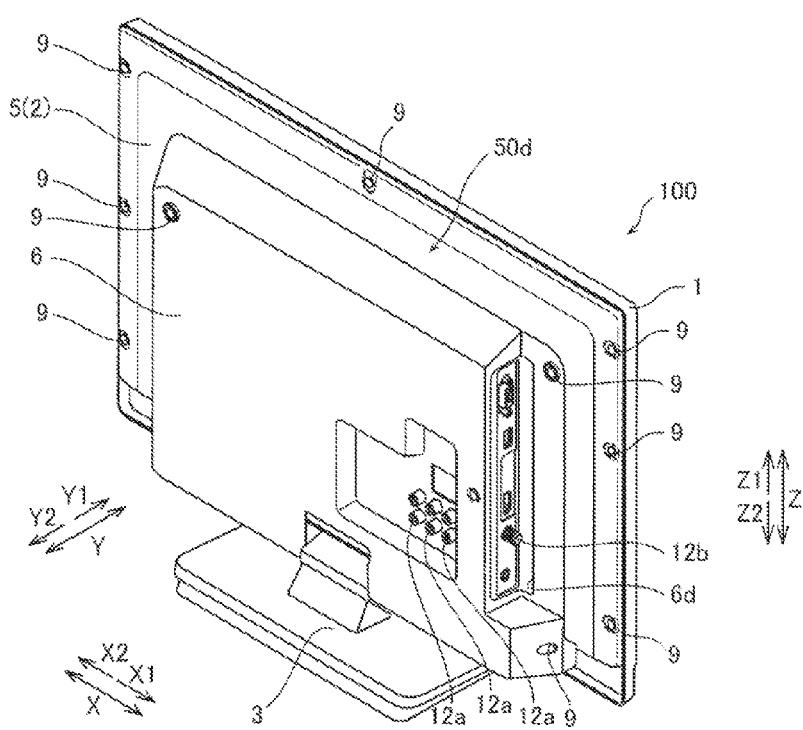
[FIG. 2] An overall perspective view of the liquid crystal television device according to the embodiment of the present invention as viewed from a rear side.

The liquid crystal television device 100 according to the embodiment of the present invention has a rectangular shape, and includes a frame-shaped front housing 1, a liquid crystal module 2 stored in the front housing 1, and a stand member 3 (see FIG. 2) supporting the whole liquid crystal television device 100, as shown in FIGS. 1 and 2. The liquid crystal module 2 is an example of the "display panel" in the present invention. The front housing 1 and the stand member 3 are both made of resin.

Figure 3:
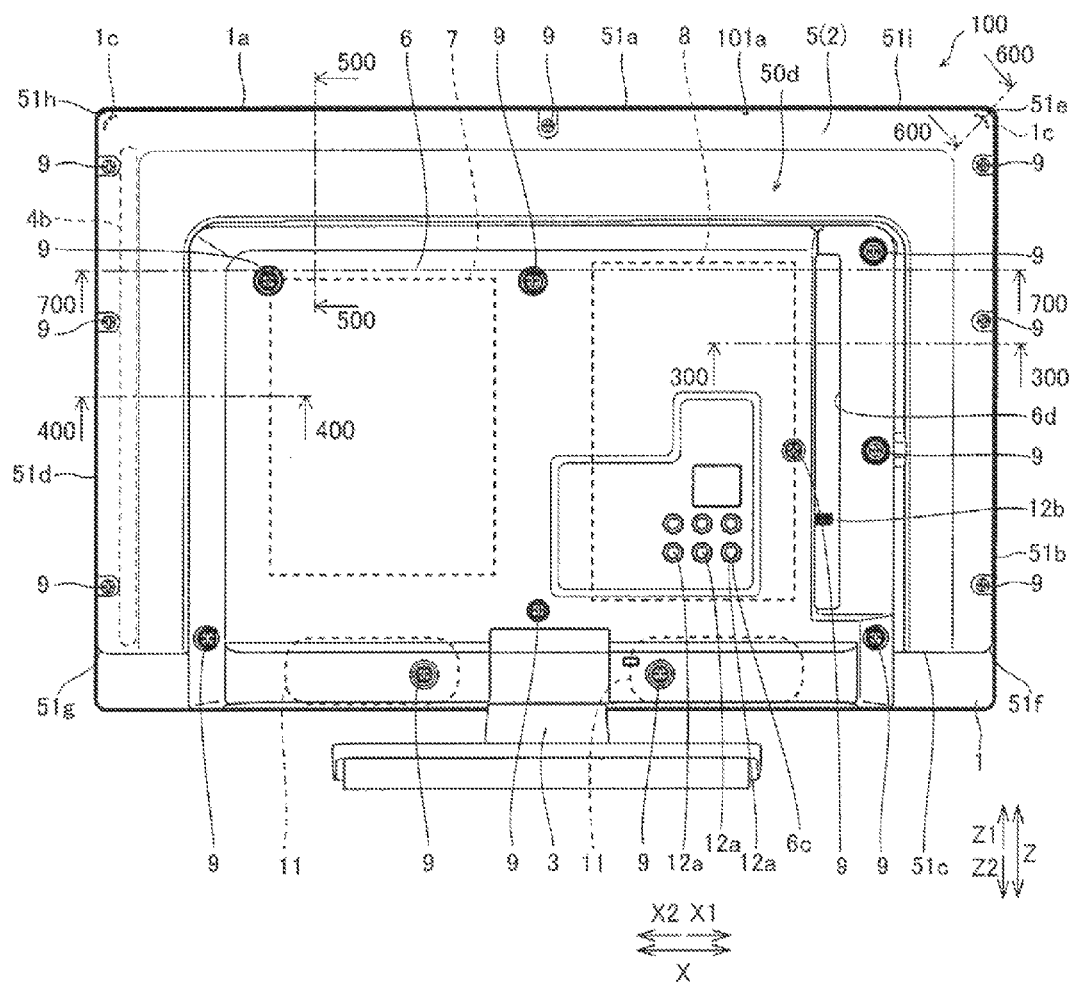
[FIG. 3] A plan view of the liquid crystal television device according to the embodiment of the present invention as viewed from the rear side.

As shown in FIGS. 2 and 3, a rear frame 5 made of metal consisting of sheet metal is arranged on a rear surface side (Y2 side, see FIG. 2) of the front housing 1. The rear frame 5 is an example of the "substrate mounting member" in the present invention. The rear frame 5 has a rectangular shape as viewed from behind (Y2 side), and is formed to be smaller than the front housing 1. As shown in FIG. 3, an inner peripheral surface 101a of a peripheral edge portion 1a of the front housing 1 is configured to approach (to come into contact with) outer peripheral surfaces 51i, described later, of the rear frame 5 and to cover the outer peripheral surfaces 51i of the rear frame 5.

One cover member 6 made of resin is mounted on a back surface (rear surface) side (Y2 side, see FIG. 4) of the rear frame 5 made of sheet metal. This cover member 6 has a rectangular shape as viewed from behind (Y2 side), and is formed to be smaller than the front housing 1 and the rear frame 5.

Figure 4:
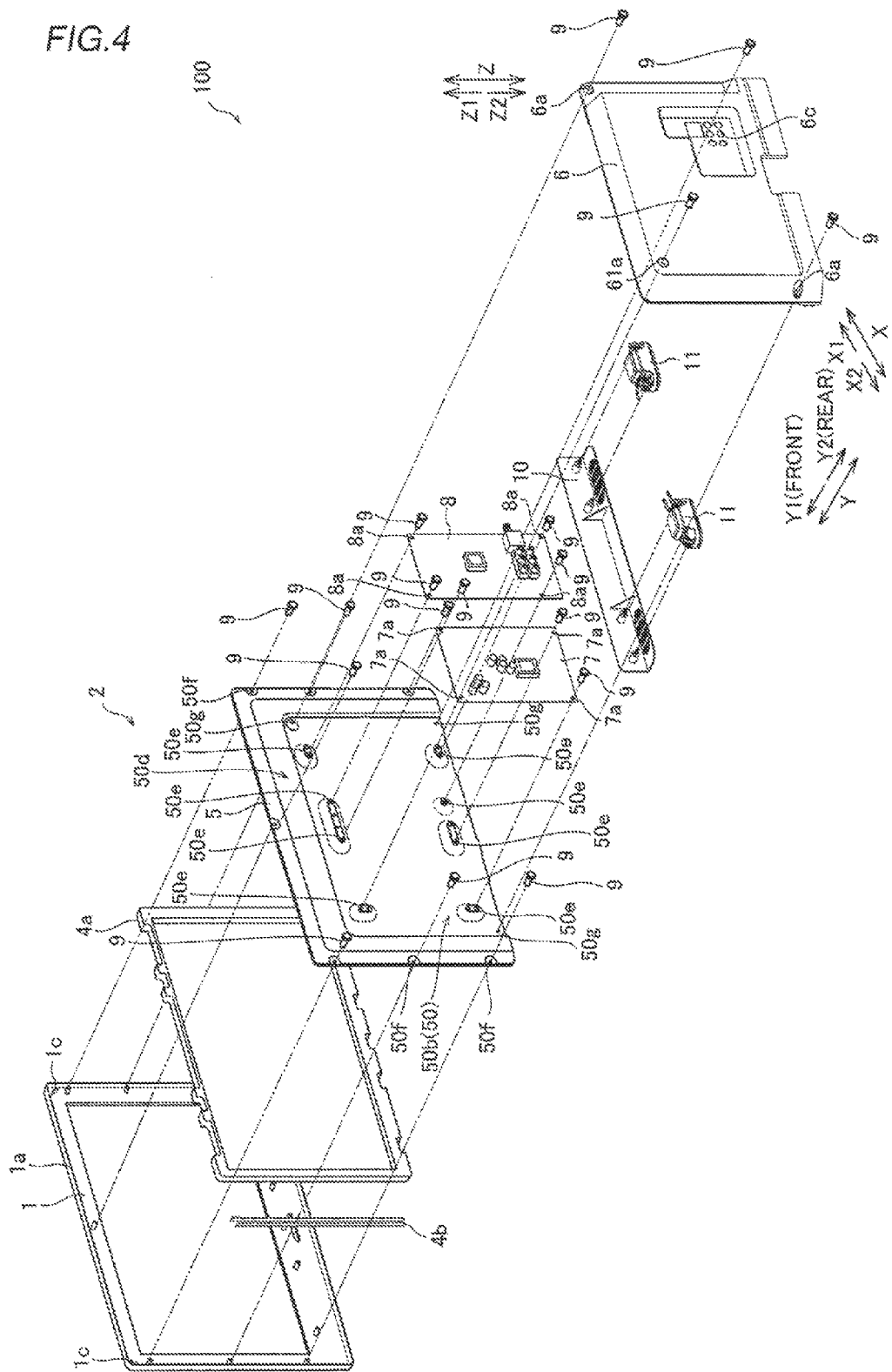
[FIG. 4] An exploded perspective view showing the structure of the liquid crystal television device according to the embodiment of the present invention.

As shown in FIG. 4, components such as a light reflection sheet (not shown), a light guide (not shown), an optical sheet (not shown), a frame-shaped resin frame 4a, a liquid crystal cell (not shown) and a frame-shaped bezel (not shown) are arranged between the front housing 1 and the rear frame 5 from the rear frame 5 toward the direction (arrow Y1 direction) of the front housing 1. A light source 4b constituted of a plurality of LEDs is arranged on a side portion on an X2 side of the resin frame 4a. The light source 4b is an example of the "backlight source" in the present invention. Thus, the rear frame 5 arranged to cover the aforementioned unshown components and the light source 4b is configured to be covered with the front housing 1 from the front side (Y1 side). The liquid crystal module 2 includes the resin frame 4a, the aforementioned unshown components, the light source 4b and the rear frame 5.

Figure 5:
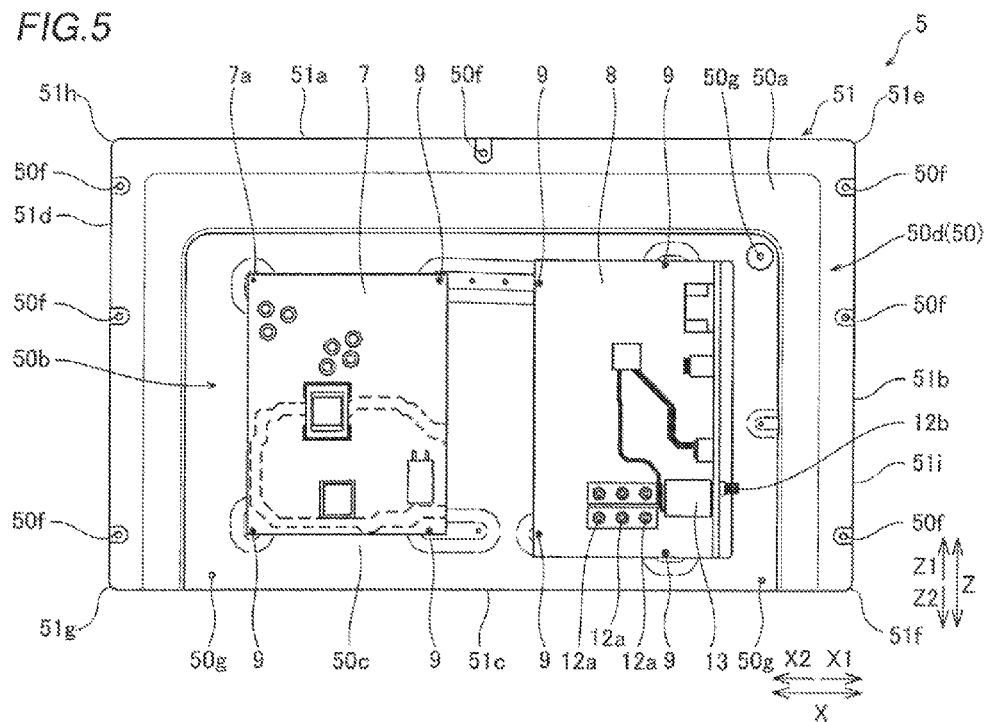
[FIG. 5] A plan view of a rear frame mounted with a circuit board according to the embodiment of the present invention as viewed from the rear side.
Figure 6:
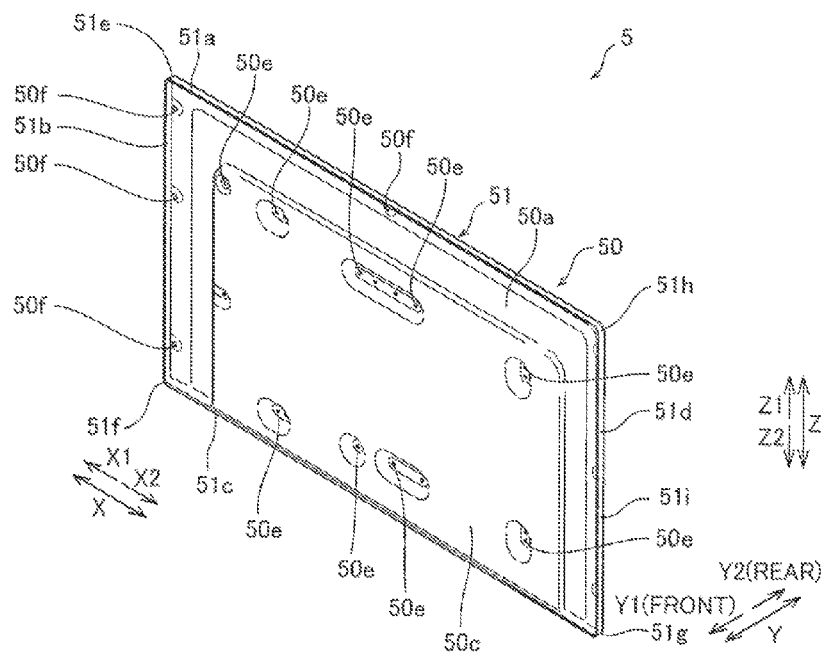
[FIG. 6] A perspective view of the rear frame according to the embodiment of the present invention as viewed from the front side.
Figure 7:
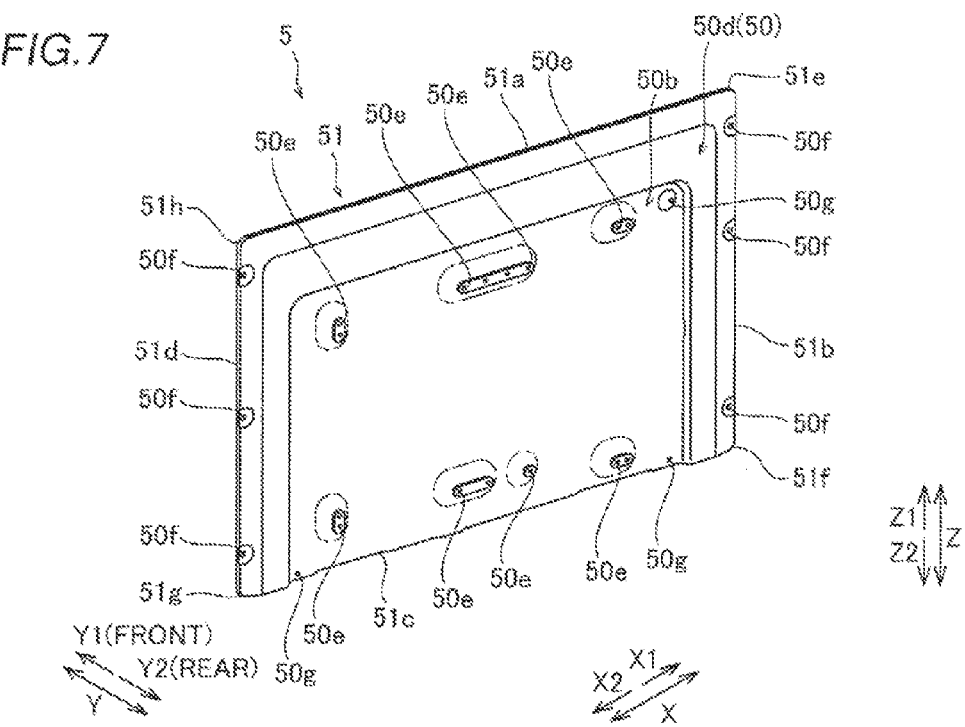
[FIG. 7] A perspective view of the rear frame according to the embodiment of the present invention as viewed from the rear side.

The rear frame 5 includes a bottom surface portion 50 formed in a substantially rectangular shape and four side surface portions 51a, 51b, 51c and 51d positioned on an outer peripheral portion 51 of the rear frame 5 and extending from the bottom surface portion 50 toward the front side (Y1 side, see FIG. 6), as shown in FIGS. 5 to 7. These four side surface portions 51a to 51d are formed by such an operation that portions of the bottom surface portion 50 in the vicinity of the outer peripheral portion 51 are bent in a direction (Y1 side) perpendicular to the bottom surface portion 50 when forming the rear frame 5 by drawing press working.

The side surface portions 51a to 51d of the rear frame 5 are formed to extend over the whole periphery of the outer peripheral portion 51 of the rear frame 5, while corner portions 51e, 51f, 51g and 51h on four corners of the outer peripheral portion 51 are all configured to be exposed outward.

Figure 8:
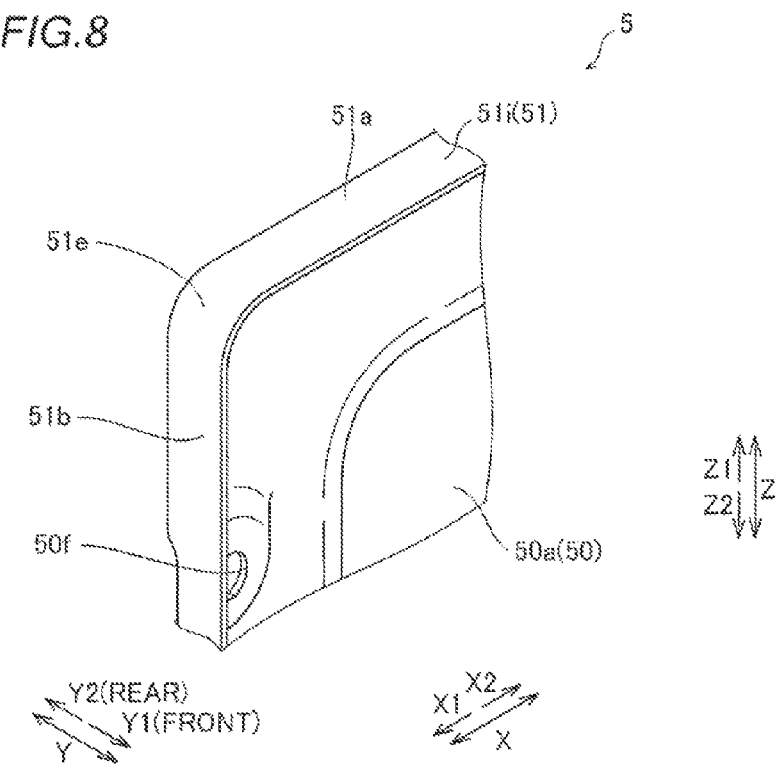
[FIG. 8] An enlarged perspective view of the periphery of a corner portion of the rear frame according to the embodiment of the present invention as viewed from the front side.
Figure 9:
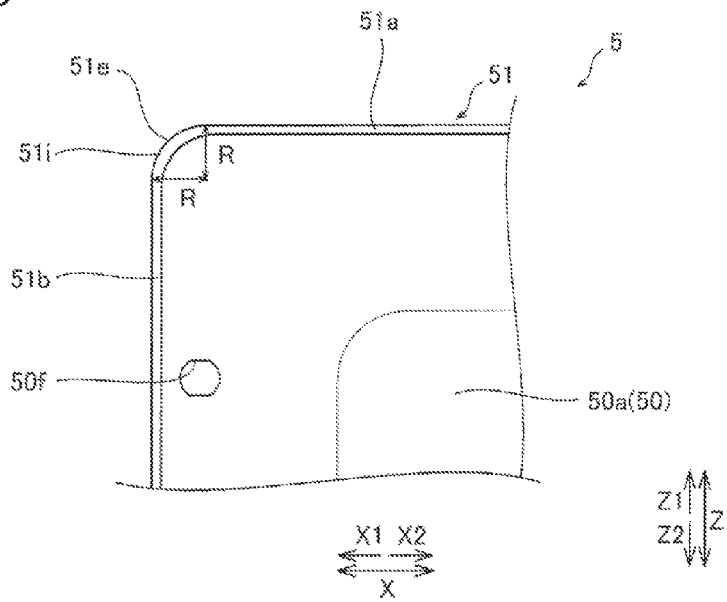
[FIG. 9] An enlarged view of the periphery of the corner portion of the rear frame according to the embodiment of the present invention as viewed from the front side.

According to this embodiment, the adjacent pair of side surface portions 51a and 51b are bonded to each other without a clearance on the corner portion 51e of the outer peripheral portion 51. More specifically, an X1-side end portion of the side surface portion 51a linearly extending in an X direction and a Z1-side end portion of the side surface portion 51b linearly extending in a Y direction are integrally connected with each other by the corner portion 51e without a clearance, as shown in FIGS. 8 and 9. Further, the outer peripheral surface 51i on the corner portion 51e is formed to have a round shape (curved surface shape) of a prescribed radius R of curvature (see FIG. 9). The corner portion 51e is integrally formed simultaneously with the pair of side surface portions 51a and 51b when forming the rear frame 5 by drawing press working.

Similarly, the adjacent pair of side surface portions 51b and 51c are integrally connected with each other without a clearance on the corner portion 51f, as shown in FIGS. 5 to 7. Further, the adjacent pair of side surface portions 51c and 51d are integrally connected with each other without a clearance on the corner portion 51g. In addition, the adjacent pair of side surface portions 51d and 51a are integrally connected with each other without a clearance on the corner portion 51h. Similarly to the corner portion 51e, the outer peripheral surfaces 51i on the corner portions 51f to 51h are all formed to have round shapes of the prescribed radius R of curvature. The corner portions 51f to 51h are integrally formed simultaneously with the side surface portions 51a to 51d when forming the rear frame 5 by drawing press working.

Figure 10:
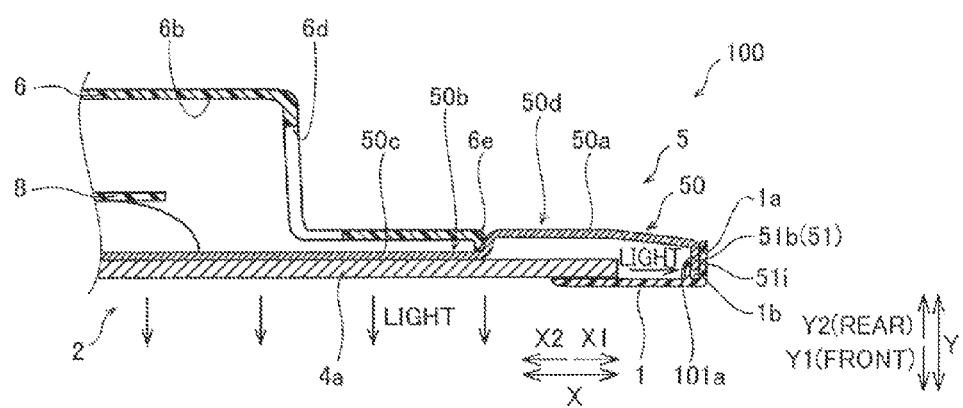
[FIG. 10] A sectional view of the liquid crystal television device along the line 300-300 in FIG. 3.
Figure 11:
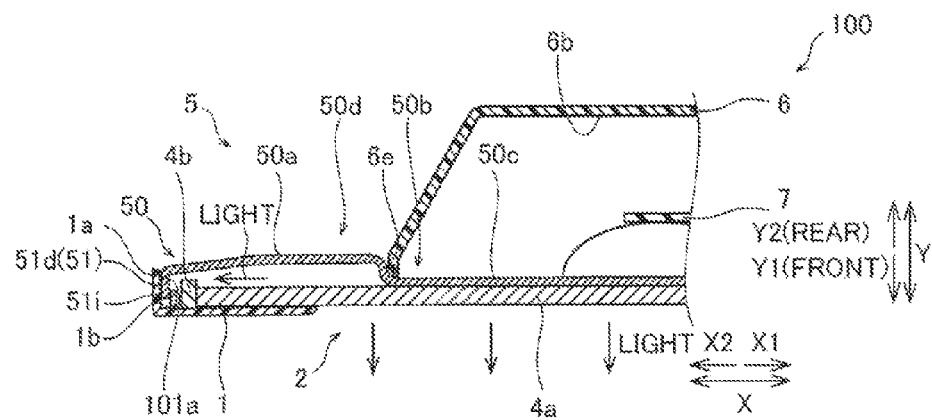
[FIG. 11] A sectional view of the liquid crystal television device along the line 400-400 in FIG. 3.
Figure 12:
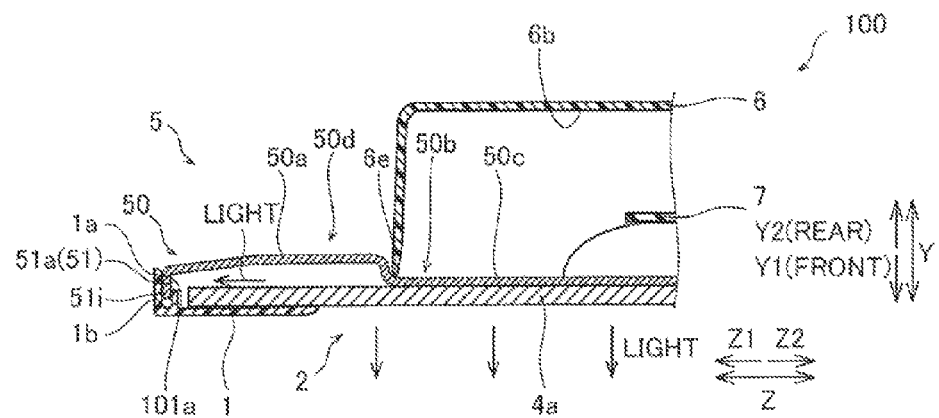
[FIG. 12] A sectional view of the liquid crystal television device along the line 500-500 in FIG. 3.

As shown in FIGS. 10 to 12, a projecting portion 50a swelling toward the rear side (Y2 side) is formed on a non-substrate-mounting region 50d (region of the rear frame 5 exposed from the cover member 6), described later, of the bottom surface portion 50 of the rear frame 5 in the vicinity of the outer peripheral portion 51. This projecting portion 50a is formed to gradually swell toward the rear side (Y2 side) from the vicinity of the side surface portions 51a, 51b and 51d.

The bottom surface 50 is so concaved toward the front side (Y1 side) that a recess portion 50c formed in a concave shape as a whole is formed on a substrate mounting region 50b on an inner side (central side) of a region of the bottom surface portion 50 where the projecting portion 50a is formed. The projecting portion 50a and the recess portion 50c of the bottom surface portion 50 of the rear frame 5 are integrally formed by drawing press working.

As shown in FIG. 5, a circuit board 7 having a function of supplying power to the whole device and a circuit board 8 for signal processing are alignedly mounted on the rear surface of the substrate mounting region 50b consisting of the recess portion 50c of the bottom surface portion 50 of the rear frame 5 at a prescribed interval in the X direction. More specifically, the rear surface of the rear frame 5 includes the substrate mounting region 50b provided on a central portion so that the two circuit boards 7 and 8 are mounted thereon and the non-substrate-mounting region 50d provided to surround the periphery of the substrate mounting region 50b and consisting of a region other than the substrate mounting region 50b, as shown in FIGS. 6 and 7. A plurality of substrate mounting threaded holes 50e for mounting the respective ones of the two circuit boards 7 and 8 are formed on the substrate mounting region 50b (rear surface of the rear frame 5) consisting of the recess portion 50c. These substrate mounting threaded holes 50e are provided on portions protruding toward the rear side (Y2 side) beyond the substrate mounting region 50b consisting of the recess portion 50c.

As shown in FIG. 4, screw insertion holes 7a for inserting screws 9 thereinto are formed on an outer edge portion of the circuit board 7, while screw insertion holes 8a for inserting the screws 9 thereinto are formed on an outer edge portion of the circuit board 8. The plurality of screws 9 are mounted on the plurality of substrate mounting threaded holes 50e of the rear frame 5 through the screw insertion holes 7a of the circuit board 7 and the screw insertion holes 8a of the circuit board 8, whereby the respective ones of the two circuit boards 7 and 8 are fixed to the rear frame 5.

Figure 13:
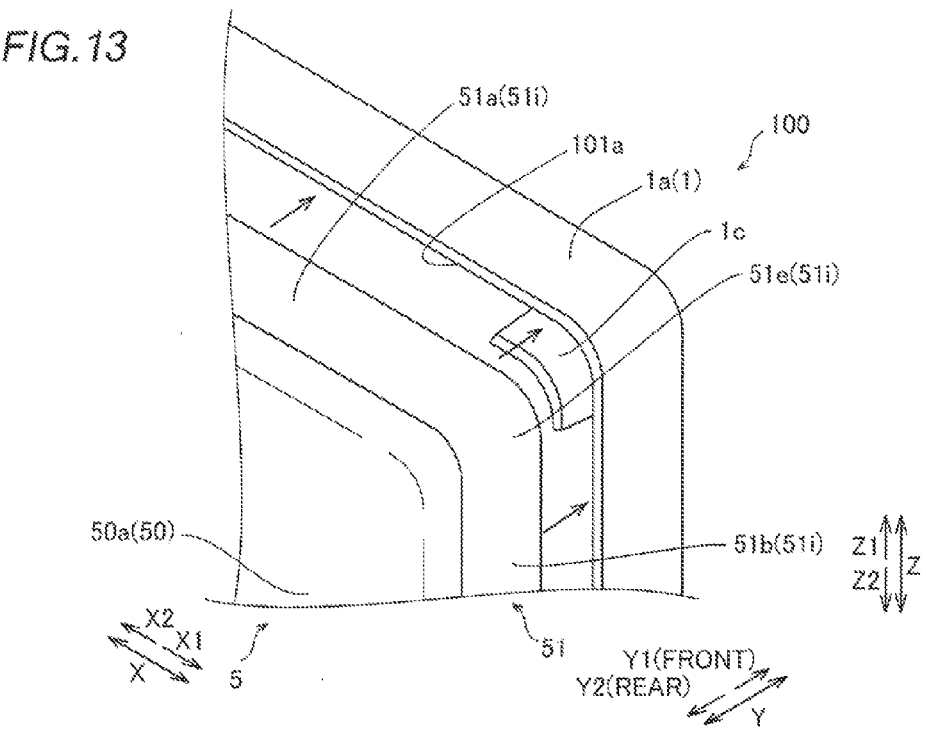
[FIG. 13] An enlarged perspective view for illustrating fitting between a front housing and the rear frame according to the embodiment of the present invention.
Figure 14:
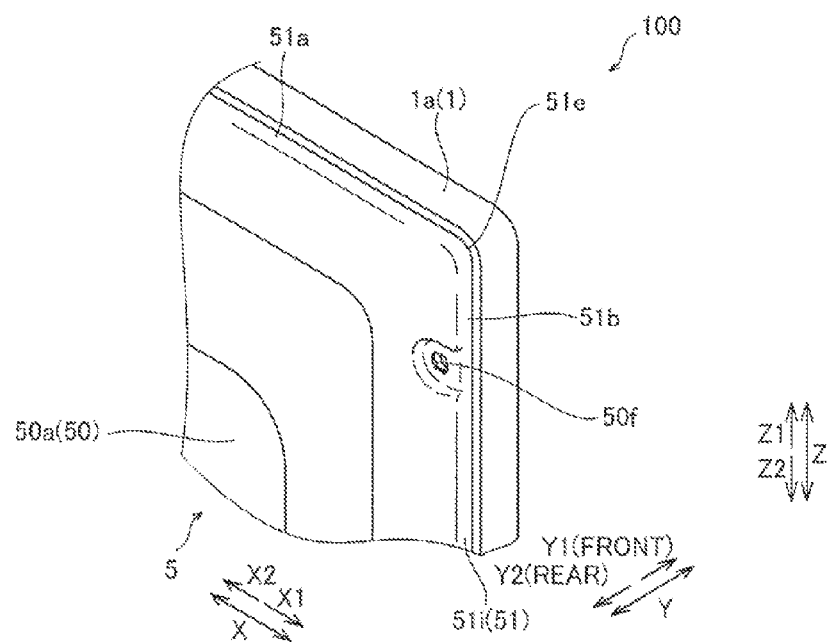
[FIG. 14] An enlarged perspective view of the fitting between the front housing and the rear frame according to the embodiment of the present invention as viewed from the rear side.
Figure 15:
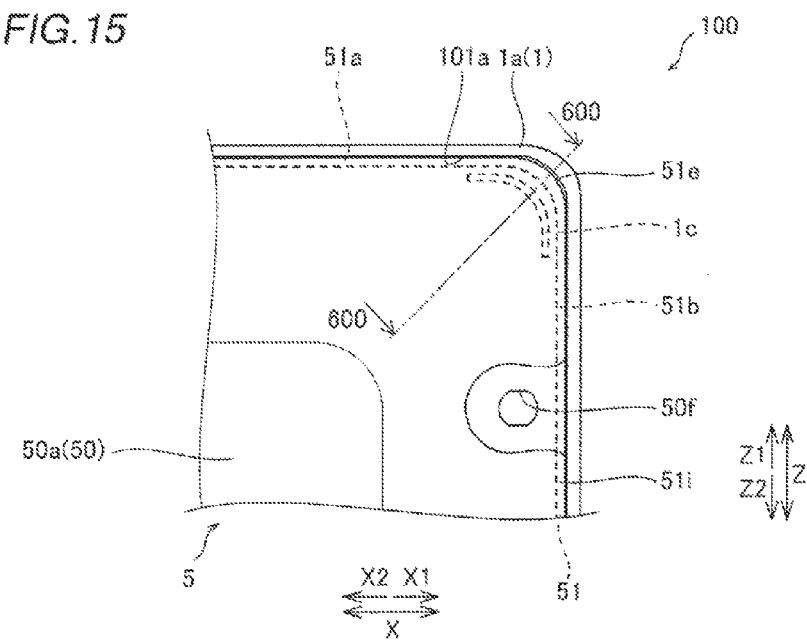
[FIG. 15] An enlarged view of the fitting between the front housing and the rear frame according to the embodiment of the present invention as viewed from the rear side.

As shown in FIG. 5, a plurality of screw insertion holes 50f are formed along the outer peripheral portion 51 of the bottom surface portion 50 (rear surface of the rear frame 5) of the rear frame 5. As shown in FIG. 3, the respective ones of the plurality of screws 9 are mounted on the plurality of screw insertion holes 50f (see FIG. 5), whereby the rear frame 5 is mounted on the front housing 1. The liquid crystal television device 100 is so configured that the rear frame 5 is fitted into the front housing 1 so that the inner peripheral surface 101a of the front housing 1 approaches the outer peripheral portion 51 of the rear frame 5 and is opposed to the outer peripheral surfaces 51i of the outer peripheral portion 51 at this time, as shown in FIGS. 13 to 15. The outer peripheral surfaces 51i of the corner portions 51e and 51f (see FIG. 3) of the rear frame 5 have the round shapes, whereby it is possible to easily arrange the corner portions 51e and 51f of the rear frame 5 on corner portions of the front housing 1.

As shown in FIGS. 10 to 12, rail portions 1b between which the side surface portions 51a, 51b and 51d of the rear frame 5 are held are formed on portions of the peripheral edge portion 1a of the front housing 1 opposed to the side surface portions 51a, 51b and 51d of the rear frame 5 respectively. Thus, the liquid crystal television device 100 is so configured that the rear frame 5 is positioned on the front housing 1 by the rail portions 1b. In the rail portions 1b, outer-side inner side surfaces (X1-side inner side surface in FIG. 10, for example) are configured to become the inner peripheral surface 101a of the peripheral edge portion 1a of the front housing 1.

Figure 16:
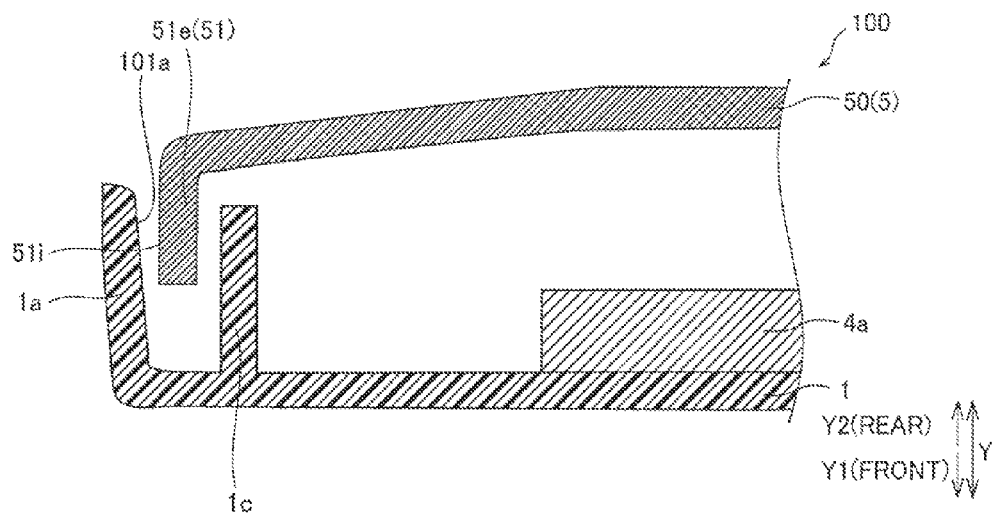
[FIG. 16] A sectional view of the liquid crystal television device along the lines 600-600 in FIGS. 3 and 15.

As shown in FIG. 3, no rail portions 1b are formed on portions of the peripheral edge portion 1a of the front housing 1 opposed to the corner portions 51e and 51h on the upper side (Z1 side) of the rear frame 5. On the other hand, ribs 1c are provided in the vicinity of the corner portions of the front housing 1 corresponding to the corner portions 51e and 51h respectively. This pair of ribs 1c are formed on inner sides (resin frame 4a sides) beyond the peripheral edge portion 1a of the front housing 1 and the corner portions 51e and 51h of the rear frame 5 respectively. Further, the pair of ribs 1c are formed to protrude toward the rear surface side up to projection height positions slightly lower than projection heights toward the rear surface side (Y2 side) of the peripheral edge portion 1a, as shown in FIG. 16. In addition, the pair of ribs 1c are formed in curved surface shapes to correspond to the corner portions 51e and 51h (see FIG. 3) respectively, as shown in FIG. 15. Thus, the pair of ribs 1c are configured to effectively inhibit light from the light source 4 from reaching the corner portions 51e and 51h of the rear frame 5 respectively. The ribs 1c are examples of the "light shielding portion" in the present invention.

As shown in FIG. 16, the peripheral edge portion 1a of the front housing 1 and the corner portions 51e and 51h (see FIG. 3) of the rear frame 5 are arranged not to come into contact with each other. Thus, it is possible to inhibit the peripheral edge portion 1a from coming into contact with the corner portions 51e and 51h and being damaged.

As shown in FIG. 4, a plurality of cover member mounting threaded holes 50g are formed on the rear surface (Y2 side) of the bottom surface portion 50 of the rear frame 5, while a plurality of screw insertion holes 6a and 61a are formed on the cover member 6. The screws 9 are mounted on the respective ones of the plurality of screw insertion holes 6a and 61a, whereby the cover member 6 made of resin is mounted on the rear frame 5 made of metal. More specifically, the screws 9 are mounted on the cover member mounting threaded holes 50g of the rear frame 5 through the screw insertion holes 6a of the cover member 6, whereby the cover member 6 is fixed to the rear frame 5. The screw 9 inserted into the screw insertion hole 61a formed on the upper left side of the cover member 6 is mounted on the substrate mounting threaded hole 50a formed on the upper left side of the rear frame 5 through the screw insertion hole 7a formed on the upper left side of the circuit board 7.

The cover member 6 is mounted on the cover member mounting threaded holes 50g formed on the lower side (Z2 side) among the cover member mounting threaded holes 50g formed on the rear surface of the rear frame 5 through the screws 9, to hold a speaker mounting member 10 therebetween. Two speakers 11 are mounted on the speaker mounting member 10. The cover member 6 is mounted to cover the two circuit boards 7 and 8 and the speaker mounting member 10 mounted with the two speakers 11 from behind (Y2 side).

As shown in FIG. 4, the cover member 6 is arranged to cover left, right and upper edge portions of the substrate mounting region 50b of the bottom surface portion 50 of the rear frame 5 mounted with the two circuit boards 7 and 8 from behind (Y2 side) and to expose the non-substrate-mounting region 50d on the rear surface (Y2 side) of the rear frame 5. No non-substrate-mounting region 50d is provided on a lower edge portion side (Z2 side) of the substrate mounting region 50b of the rear frame 5. Thus, the non-substrate-mounting region 50d of the rear frame 5 exposed from the cover member 6 has an inverted U shape (see FIG. 3).

As shown in FIG. 3, a rear housing of the liquid crystal television device 100 is constituted of the inverted U-shaped non-substrate-mounting region 50d in the vicinity of the exposed outer peripheral portion 51 of the rear frame 5 made of metal (sheet metal). In other words, a portion of the rear frame 5 made of metal constituting the liquid crystal module 2 exposed from the cover member 6 is employed also as the rear housing in this embodiment. In brief, the rear housing is constituted of the non-substrate-mounting region 50d of the rear frame 5 made of metal and the cover member 6. The exposed inverted U-shaped non-substrate-mounting region 50d of the rear frame 5 made of metal is configured to function as a heat radiation portion radiating heat generated from the circuit boards 7 and 8 mounted on the substrate mounting region 50b (see FIG. 5) outward.

Figure 17:
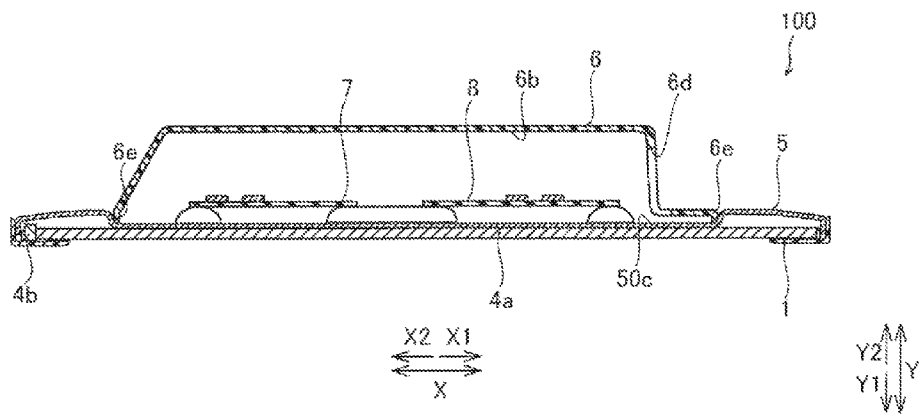
[FIG. 17] A sectional view along the line 700-700 in FIG. 3.

As shown in FIG. 17, an inner peripheral edge portion of the recess portion 50c constituting the substrate mounting region 50b of the bottom surface portion 50 is formed to correspond to the outer peripheral portion of the cover member 6. The cover member 6 has a recess portion 6b storing the two circuit boards 7 and 8 mounted on the substrate mounting region 50 on the rear surface of the rear frame 5. This recess portion 6b of the cover member 6 has a shape concaved rearward (in an arrow Y2 direction). The two circuit boards 7 and 8 are stored in the recess portion 6b of the cover member 6, and covered with the cover member 6 in a state separating from the inner surface of the cover member 6. At this time, end portions 6e of the cover member 6 are fitted into the inner peripheral edge portion of the recess portion 50c of the bottom surface portion 50 from the Y2 side, whereby the cover member 6 in a state covering the recess portion 50c (substrate mounting region 50b) is mounted to fit into the bottom surface portion 50 (substrate mounting region 50b) of the rear frame 5.

Figure 18:
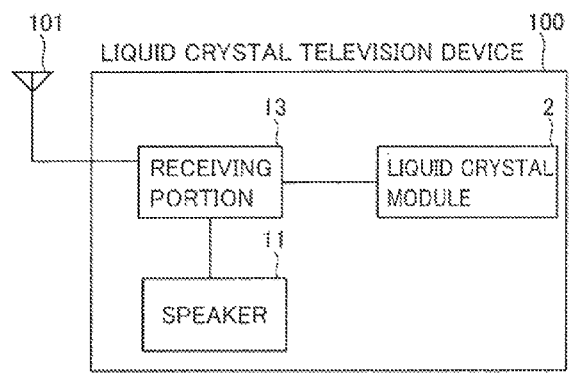
[FIG. 18] A block diagram showing the structure of the liquid crystal television device according to the embodiment of the present invention.

As shown in FIG. 5, the circuit board 8 for signal processing arranged on the X1 side in the two circuit boards 7 and 8 mounted on the rear frame 5 has external connection terminals 12a and 12b and a receiving portion (tuner) 13, capable of receiving television broadcasting, connected with the external connection terminal 12b. In the liquid crystal television device 100, the receiving portion 13 is connected with the liquid crystal module 2 and the speakers 11, and configured to output a picture signal to the liquid crystal module 2 and to output a sound signal to the speakers 11 in television broadcasting signals (the picture signal and the sound signal) received by the antenna 101, as shown in FIG. 18. As shown in FIG. 2, the external connection terminals 12a are provided on the circuit board 8 to protrude from the circuit board 8 toward the rear surface (Y2 side), while the external connection terminal 12b is provided on the circuit board 8 to protrude from the circuit board 8 toward a side portion (X1 side).

Figure 19:
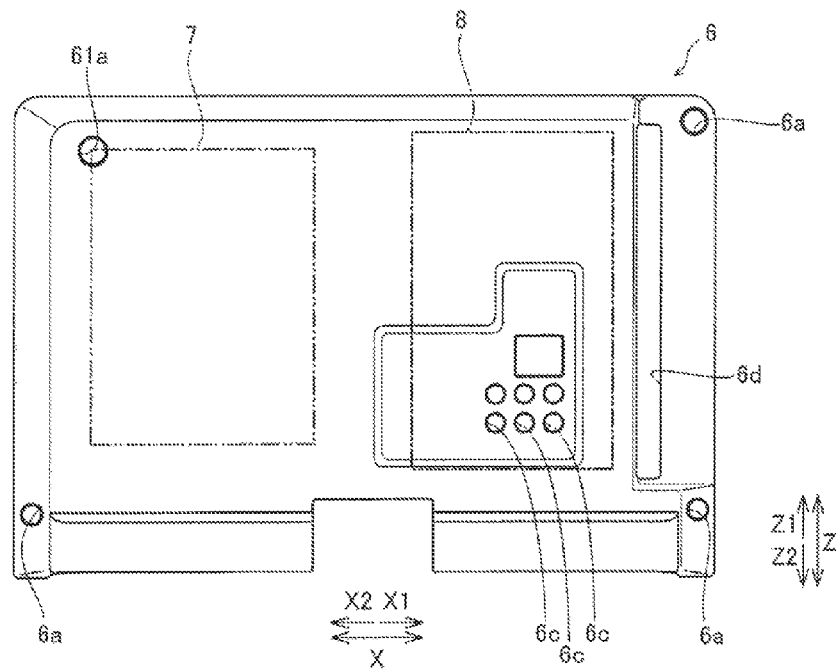
[FIG. 19] A back elevational view (rear elevational view) of a cover member according to the embodiment of the present invention.

As shown in FIG. 19, six openings 6c having round hole shapes for exposing the external connection terminals 12a provided on the circuit board 8 rearward (in the arrow Y2 direction) are provided on the rear surface of the cover member 6. As shown in FIG. 3, the six external connection terminals 12a provided on the circuit board 8 are configured to be connectable with connection wires of an externally provided electronic apparatus or the like through the six openings 6c of the cover member 6 respectively. The cover member 6 has an opening 6d for exposing the external connection terminal 12b provided on the circuit board 8 toward the side portion (arrow X1 direction). This opening 6d has a rectangular shape extending in the vertical direction (Z direction) as viewed from the side portion (X direction).

A case of mounting the cover member 6 of one size on rear frames 5 and 105 of different sizes is now described with reference to FIGS. 20 and 21.

Figure 20:
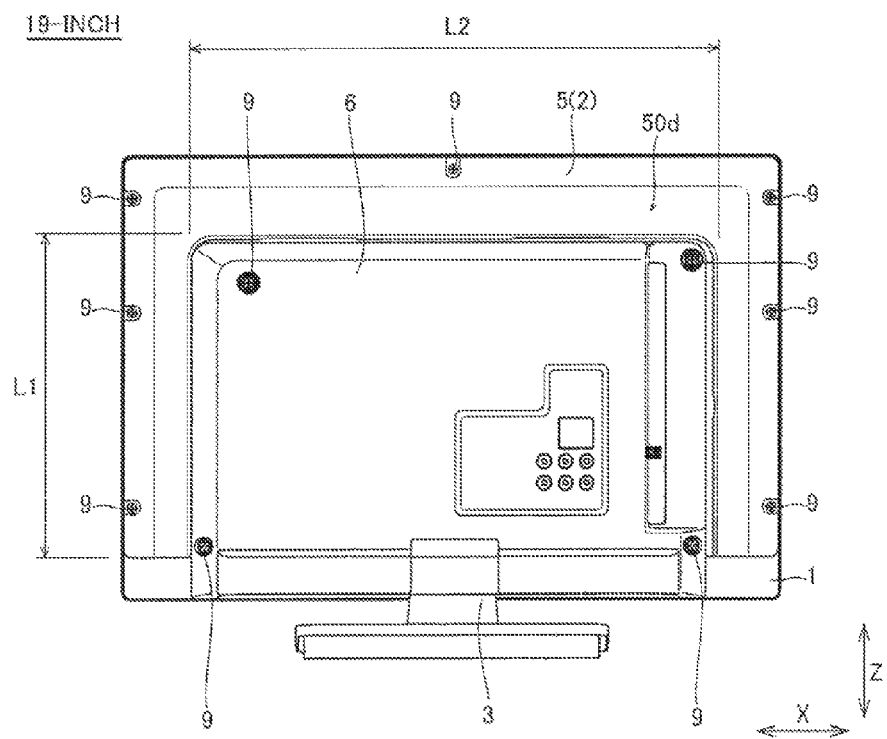
[FIG. 20] A diagram showing a case of mounting the cover member according to the embodiment of the present invention on a rear frame of a 19-inch liquid crystal television device.
Figure 21:
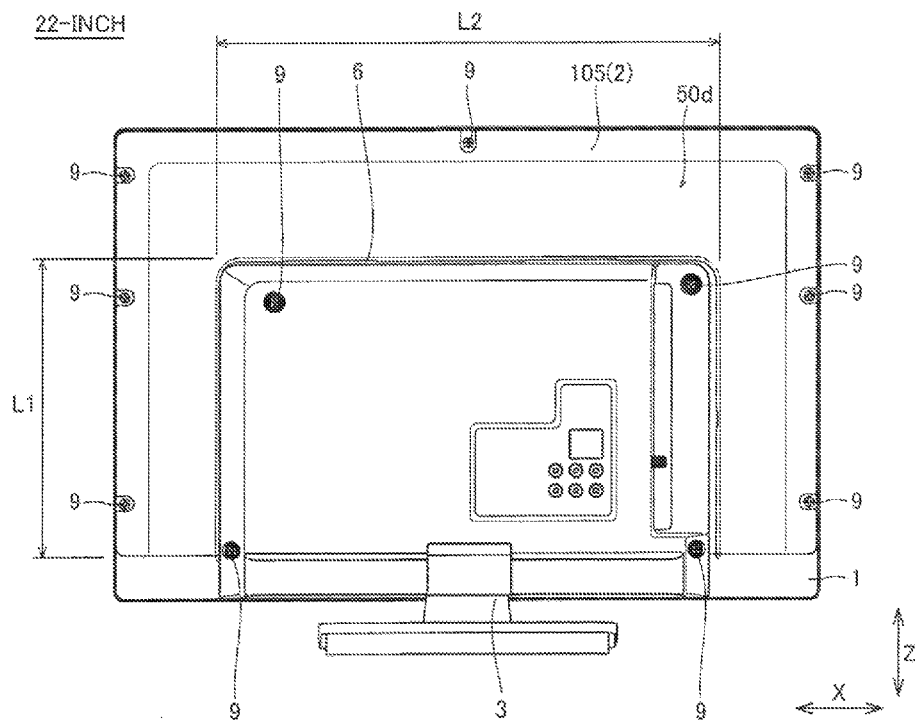
[FIG. 21] A diagram showing a case of mounting the cover member according to the embodiment of the present invention on a rear frame of a 22-inch liquid crystal television device.

As shown in FIGS. 20 and 21, the cover member 6 of one size (same size) is configured to be mountable on the rear frames 5 and 105 of different sizes. In a case of assuming that a liquid crystal television device shown in FIG. 20 is a 19-inch one (19 inches) and a liquid crystal television device shown in FIG. 21 is a 22-inch one (22 inches), for example, it is possible to mount the cover member 6 whose lengths in a Z direction and an X direction are L1 and L2 on the liquid crystal television devices of both sizes. In this case, the surface area of a non-substrate-mounting region 50d of a rear frame of the 22-inch liquid crystal television device becomes larger than the surface area of a non-substrate-mounting region 50d of the 19-inch liquid crystal television device. It is also possible to mount a cover member of a size common to 26 inches and 32 inches on a 26-inch liquid crystal television device and a 32-inch liquid crystal television device, for example, in addition to the operation of mounting the cover member 6 of the same size on the 19-inch liquid crystal television device and the 22-inch liquid crystal television device.

According to this embodiment, as hereinabove described, light from the light source 4b covered with the rear frame 5 can be inhibited from leaking outward through the corner portions 51e to 51h of the rear frame 5 by configuring the liquid crystal television device 100 so that the adjacent pairs of side surface portions 51a to 51d are integrally connected with each other without clearances on the corner portions 51e to 51h. Particularly, also in the case where the cover member 6 is arranged to expose the periphery of the outer peripheral portion 51 of the rear frame 5 of the liquid crystal module 2 as in this embodiment, the light of the light source 4b can be reliably inhibited from leaking out of the liquid crystal television device 100 through the corner portions 51e to 51h of the exposed outer peripheral portion 51, due to the corner portions 51e to 51h of the rear frame 5 having no clearances. Further, the periphery of the outer peripheral portion 51 of the rear frame 5 exposed from the cover member 6 can be easily used as the rear housing by suppressing outward light leakage from the corner portions 51e to 51h of the outer peripheral portion 51 of the rear frame 5.

According to this embodiment, as hereinabove described, the outer peripheral surfaces 51i on the corner portions 51e to 51h are formed to have the round shapes of the prescribed radius R of curvature respectively. Thus, the inner peripheral surface 101a of the front housing 1 arranged to approach the corner portions 51e to 51h can be inhibited from coming into contact with the corner portions 51e to 51h and being damaged dissimilarly to a case where the outer peripheral surfaces 51i of the corner portions 51e to 51h have angular shapes, due to the round-shaped corner portions 51e to 51h, while suppressing outward light leakage from the corner portions 51e to 51h.

According to this embodiment, as hereinabove described, the rear frame 5 is configured to be fitted into the front housing 1, so that the inner peripheral surface 101a of the peripheral edge portion 1a of the front housing 1 approaches the outer peripheral portion 51 of the rear frame 5 and is opposed to the outer peripheral surfaces 51i of the outer peripheral portion 51. Thus, the outer peripheral surfaces 51i of the side surface portions 51a to 51d of the rear frame 5 serving also as the rear housing can be covered with the inner peripheral surface 101a of the front housing 1, whereby the light from the light source 4b can be more reliably inhibited from leaking outward through the outer peripheral surfaces 51i of the side surface portions 51a to 51d of the rear frame 5.

According to this embodiment, as hereinabove described, the pair of ribs 1c are formed on the inner side (resin frame 4a side) beyond the corner portions 51e and 51h of the rear frame 5 respectively. Further, the pair of ribs 1c are formed to protrude toward the rear surface side (Y2 side), and formed in the curved surface shapes to correspond to the corner portions 51e and 51h respectively. Thus, the light of the light source 4b can be effectively inhibited from leaking out of the liquid crystal television device 100 through the corner portions 51e and 51h of the rear frame 5, due to the pair of ribs 1c.

According to this embodiment, as hereinabove described, the projecting portion 50a swelling toward the rear side (Y2 side) beyond the remaining region (region in the vicinity of the side surface portions 51a, 51b and 51d of the outer peripheral portion 51) on the region of the bottom surface portion 50 of the rear frame 5 made of metal excluding the vicinity of the side surface portions 51a, 51b and 51d of the outer peripheral portion 51. Thus, mechanical strength in the periphery of the outer peripheral portion 51 of the rear frame 5 made of metal can be improved due to the convex shape swelling toward the rear surface side (Y2 side), whereby mechanical strength necessary as the rear housing can be sufficiently ensured also in the case of employing the periphery of the outer peripheral portion 51 of the rear frame 5 exposed from the cover member 6 as the rear housing.

According to this embodiment, as hereinabove described, the liquid crystal television device 100 is so configured that the cover member 6 is fitted into the recess portion 50c of the bottom surface portion 50 from the Y2 side, so that the cover member 6 is mounted on the bottom surface portion 50 of the rear frame 5 in the state covering the recess portion 50c. Thus, the height of the recess portion 50c of the rear frame 5 decreases due to the formation in the concave shape dissimilarly to a case where the region (recess portion 50c) of the rear frame 5 covered with the cover member 6 is formed in a planar surface shape, whereby the thickness of the whole device can be reduced. Further, positioning of the cover member 6 can be easily performed by fitting the cover member 6 into the recess portion 50c of the bottom surface portion 5 from the Y2 side.

According to this embodiment, as hereinabove described, the liquid crystal television device 100 is so configured that the cover member 6 covers the recess portion 50c of the bottom portion 50 of the rear frame 5 mounted with the two circuit boards 7 and 8 from behind (Y2 side) so that the side surface portions 51a, 51b and 51c of the rear surface of the rear frame 5 are exposed, and so configured that a portion of the rear frame 5 made of metal in the vicinity of the exposed outer peripheral portion 51 functions as the heat radiation portion radiating the heat generated from the circuit boards 7 and 8 mounted on the recess portion 50c outward. Thus, the light of the light source 4b can be reliably inhibited from leaking out of the liquid crystal television device 100 through the corner portions 51e to 51h of the exposed outer peripheral portion 51 while efficiently radiating the heat from the circuit boards 7 and 8 mounted on the rear frame 5 made of metal from a region in the periphery of the exposed outer peripheral portion 51 of the rear frame 5 outward.

According to this embodiment, as hereinabove described, the cover member 6 is mounted on the rear surface (Y2 side) of the rear frame 5, to cover the two circuit boards 7 and 8 and the two speakers 11. Thus, no member for covering the speakers 11 may be separately provided, whereby the number of components can be reduced.

According to this embodiment, as hereinabove described, the cover member 6 is arranged to cover the substrate mounting region 50b mounted with the circuit boards 7 and 8 on the rear surface from behind and to expose the non-substrate-mounting region 50d of the rear surface of the rear frame 5 other than the substrate mounting region 50b. Thus, the circuit boards 7 and 8 mounted on the substrate mounting region 50b of the rear frame 5 can be directly covered with the cover member 6, whereby no member other than the cover member 6 may be separately provided, so that the number of components can be inhibited from increasing. Further, the heat generated from the circuit boards 7 and 8 can be efficiently radiated outward from the exposed non-substrate-mounting region 50d of the rear frame 5, dissimilarly to a case of covering both of the substrate mounting region 50b and the non-substrate-mounting region 50d of the rear frame 5 with the cover member 6. In addition, the rear housing is constituted of the exposed non-substrate mounting region 50d of the rear frame 5, whereby no rear housing may be separately provided also in the case of arranging the cover member 6 to cover only part (substrate mounting region 50b) of the rear frame 5.

According to this embodiment, as hereinabove described, the cover member 6 arranged to cover the substrate mounting region 50b and to expose the non-substrate-mounting region 50d has the openings 6c exposing the six external connection terminals 12a of the circuit board 8 and the opening 6d exposing the external connection terminal 12b. Thus, the external connection terminals 12a and 12b of the circuit board 8 can be easily connected with connection wires of an externally provided electronic apparatus or the like through the openings 6c and 6d of the cover member 6 in the state where the circuit boards 7 and 8 are covered with the cover member 6.

According to this embodiment, as hereinabove described, the rear frame 5 constituting the rear housing is made of metal while the exposed non-substrate-mounting region 50d of the rear frame 5 is made to function as the heat radiation portion radiating the heat of the circuit boards 7 and 8 mounted on the substrate mounting region 50b outward so that heat is more easily transferred as compared with a case where the rear frame 5 constituting the rear housing is made of resin, whereby the heat generated from the circuit boards 7 and 8 can be more efficiently radiated outward.

According to this embodiment, as hereinabove described, the circuit boards 7 and 8 mounted on the substrate mounting region 50b of the rear surface of the rear frame 5 are covered with the cover member 6 in the state stored in the recess portion 6b of the cover member 6. Thus, the circuit boards 7 and 8 protruding rearward can be easily stored due to the recess portion 6b of the cover member 6 also in the case where the circuit boards 7 and 8 are mounted on the rear surface of the rear frame 5 to protrude rearward, whereby the whole circuit boards 7 and 8 can be easily covered with the cover member 6.

According to this embodiment, as hereinabove described, the non-substrate-mounting region 50d is provided on the rear surface of the rear frame 5 to surround the periphery of the substrate mounting region 50b so that the area of the exposed region effective for heat radiation can be enlarged due to the non-substrate-mounting region 50d exposed to surround the periphery of the substrate mounting region 50b of the rear frame 5, whereby the heat generated from the circuit boards 7 and 8 mounted on the substrate mounting region 50b of the rear frame 5 can be more effectively radiated.

According to this embodiment, as hereinabove described, the cover member 6 is mounted to fit into the substrate mounting region 50b of the concave shape, whereby the substrate mounting region 50b of the rear frame 5 is so formed in the concave shape that the thickness of the whole liquid crystal television device 100 can be reduced, dissimilarly to a case where the substrate mounting region 50b of the rear frame 5 is formed in a planar surface shape.

According to this embodiment, as hereinabove described, the frame-shaped front housing 1 having the inner peripheral surface 101a covering the periphery of the outer peripheral portion 51 to approach the outer peripheral portion 51 of the rear frame 5 constituting the rear housing, whereby the front housing 1 and the rear housing (rear frame 5) can be easily formed in corresponding shapes by making the inner peripheral surface 101a of the front housing 1 approach the outer peripheral portion 51 of the rear frame 5 constituting the rear housing.

According to this embodiment, as hereinabove described, the cover member 6 is arranged to also cover the speakers 11 in addition to the circuit boards 7 and 8 while exposing the non-substrate-mounting region 50d, whereby no member for covering the speakers 11 may be separately provided so that increase in the number of components can be suppressed.

According to this embodiment, as hereinabove described, the cover member 6 is configured to be mountable on display panels 2 (rear frames 5 and 105) of different sizes (19 inches, 22 inches and the like) in a common magnitude (size) so that it is not necessary to form cover members 6 of different magnitudes (sizes) to be mounted on the display panels 2 (rear frames 5 and 105) of different sizes (19 inches, 22 inches and the like), whereby manufacturing steps for the cover member 6 can be simplified.

The embodiment disclosed this time must be considered as illustrative in all points and not restrictive. The range of the present invention is shown not by the above description of the embodiment but by the scope of claims for patent, and all modifications within the meaning and range equivalent to the scope of claims for patent are included.

For example, while the example of equally exposing all of the four corner portions 51e to 51h on which the adjacent side surface portions 51a to 51d are connected with each other without clearances outward has been shown in the aforementioned embodiment, the present invention is not restricted to this. According to the present invention, only at least one portion and not more than three portions of the four corner portions 51e to 51h may be exposed outward. In this case, adjacent side surface portions may not be bonded to each other without a clearance on the corner portion(s) not exposed outward.

While such an example that the corner portions 51e to 51h connecting the adjacent side surface portions 51a to 51d with each other without clearances are integrally formed simultaneously with the side surface portions 51a to 51d has been shown in the aforementioned embodiment, the present invention is not restricted to this. According to the present invention, the corner portions and the side surface portions may not be simultaneously integrally formed. For example, the liquid crystal television device may be so configured that the adjacent side surface portions are bonded to each other without clearances on the corner portions by previously forming the side surface portions in a state separating from each other by press working or the like and thereafter bonding the side surface portions in the separating state to each other by employing a bonding method such as welding.

While such an example that the rear frame 5 is made of metal consisting of sheet metal has been shown in the aforementioned embodiment, the present invention is not restricted to this. According to the present invention, the rear frame may be configured to consist of another material such as resin. In order to improve heat radiability of the rear frame, the rear frame is preferably made of metal excellent in thermal conductivity.

While such an example that the outer peripheral surfaces 51i of the corner portions 51e to 51h are formed to have the round shapes of the prescribed radius R of curvature has been shown in the aforementioned embodiment, the present invention is not restricted to this. According to the present invention, the shapes of the outer peripheral surfaces of the corner portions are not particularly restricted, so far as the adjacent side surface portions are bonded to each other by the corner portions without clearances. For example, the outer peripheral surfaces of the corner portions may have C chamfered shapes or angular shapes.

Figure 22:
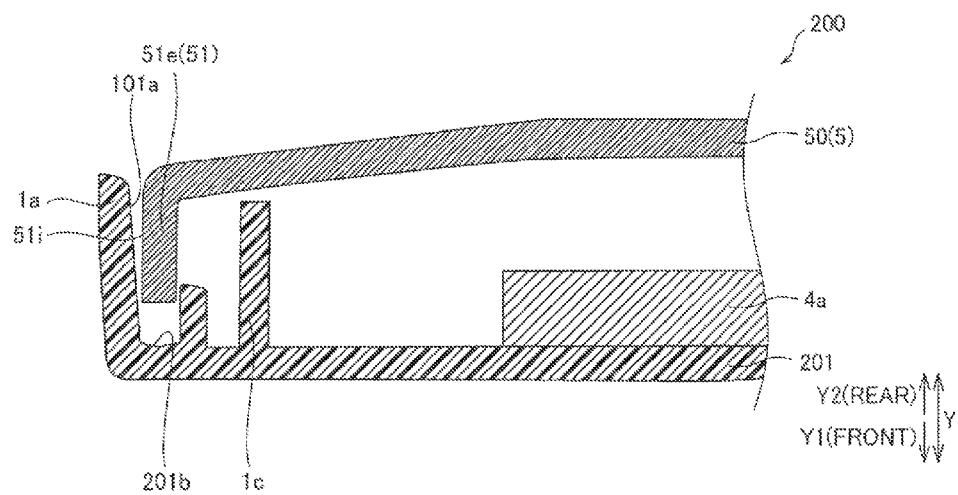
[FIG. 22] A sectional view of a liquid crystal television device according to a modification of the embodiment of the present invention.

While the example of providing the rib 1c and providing no rail portion 1b in the vicinity of the corner portion of the front housing 1 corresponding to the corner portion 51e has been shown in the aforementioned embodiment, the present invention is not restricted to this. According to the present invention, both of a rib 1c and a rail portion 201b may be provided in the vicinity of a corner portion of a front housing 201 corresponding to a corner portion 51e, as in a modification shown in FIG. 22. Thus, it is possible to effectively inhibit light from a light source from leaking out of a liquid crystal television device 200 through the corner portion 51e of a rear frame 5, due to both of a protrusion on an inner side (resin frame 4a side) of the rail portion 201b and the rib 1c. The liquid crystal television device 200 is an example of the "display device" and the "television device" in the present invention.

While the example of applying the "display device" and the "television device" in the present invention to the liquid crystal television device 100 has been shown in the aforementioned embodiment, the present invention is not restricted to this. For example, the present invention is applicable also to another display device, such as a monitor of a personal computer, for example, other than the television device or a television device other than the liquid crystal television device.

While the example of applying the rear frame as an example of the substrate mounting member for mounting the circuit board according to the present invention has been shown in the aforementioned embodiment, the present invention is not restricted to this. For example, a substrate mounting member other than the rear frame is also applicable, if it is possible to cover a substrate mounting region mounted with a circuit board with a cover member.

While the example of employing the cover member made of resin as an example of the cover member in the present invention has been shown in the aforementioned embodiment, the present invention is not restricted to this. For example, a cover member made of metal may be employed.

While the example of mounting two circuit boards on the substrate mounting region of the rear frame has been shown in the aforementioned embodiment, the present invention is not restricted to this. For example, one or at least three circuit boards may be mounted on the substrate mounting region of the rear frame. The cover member is recommendably arranged to cover the circuit board(s) in the number of one or at least three mounted on the substrate mounting region of the rear frame.

Description of Reference Signs 1, 201 front housing
1c rib (light shielding portion)
2 liquid crystal module (display panel)
4b light source (backlight source)
5 rear frame (substrate mounting member)
6 cover member
6b recess portion
6c, 6d opening
7, 8 circuit board
11 speaker
12a, 12b external connection terminal
13 receiving portion
50 bottom surface portion
50b substrate mounting region
50d non-substrate-mounting region
51 outer peripheral portion
51a, 51b, 51c, 51d side surface portion
51e, 51f, 51g, 51h corner portion
51i outer peripheral surface
100, 200 liquid crystal television device (display device, television device)
101a inner peripheral surface

The invention claimed is:

1. A display device comprising:
a display module including a backlight source and a substrate mounting member covering the backlight source; and
a cover member arranged to partially cover the rear surface of the substrate mounting member and to expose a region in the periphery of at least an outer peripheral portion of the rear surface of the substrate mounting member, wherein
the substrate mounting member has a bottom surface portion and a side surface portion, while a corner portion of the outer peripheral portion formed by the side surface portion of the substrate mounting member has such a shape that adjacent ones of the side surface portion are bonded to each other without a clearance, and
the exposed region is configured as a heat radiation portion radiating heat of at least a circuit board mounted on the substrate mounting member outward, thereby improving the heat transfer properties of the exposed region compared to a region covered by the cover member.

2. The display device according to claim 1, wherein
an outer peripheral surface of the side surface portion on the corner portion of the substrate mounting member is so formed that adjacent ones of the side surface portion are bonded to each other without a clearance to have a round shape.

3. The display device according to claim 2, wherein
a rear housing is constituted of the substrate mounting member, and
the display device further comprises a frame-shaped front housing having an inner peripheral surface approachingly opposed to the outer peripheral surface of the side surface portion of the substrate mounting member.

4. The display device according to claim 3, wherein
the front housing includes a light shielding portion formed on a position inward beyond the corner portion of the substrate mounting member to protrude toward the rear surface side.

5. The display device according to claim 1, wherein
the substrate mounting member is made of metal, and
the exposed region of the bottom surface portion of the substrate mounting member in the periphery of the outer peripheral portion has a convex shape swelling toward the rear surface side.

6. The display device according to claim 1, wherein
a region of the bottom surface portion of the substrate mounting member covered with the cover member of the substrate mounting member is formed in a concave shape, and
the cover member is mounted to fit into the region of the concave shape.

7. The display device according to claim 1, wherein the circuit board is mounted on the rear surface of the substrate mounting member, and
the cover member is arranged to cover the circuit board mounted on the rear surface of the substrate mounting member and to expose a region in the periphery of the outer peripheral portion of the rear surface of the substrate mounting member, and
the substrate mounting member is made of metal.

8. The display device according to claim 7, further comprising a speaker, wherein
the cover member is arranged to also cover the speaker in addition to the circuit board.

9. The display device according to claim 1, wherein
the circuit board is mounted on the substrate mounting region on the rear surface of the substrate mounting member,
the cover member is arranged to cover the substrate mounting region mounted with the circuit board from behind and to expose the exposed region corresponding to a non-substrate-mounting region, and
a rear housing is constituted of at least the exposed non-substrate-mounting region of the substrate mounting member.

10. The display device according to claim 9, wherein
the circuit board has an external connection terminal, and
the cover member arranged to cover the substrate mounting region and to expose the non-substrate-mounting region has an opening exposing the external connection terminal of the circuit board.

11. The display device according to claim 9, wherein
the substrate mounting member constituting the rear housing is made of metal.

12. The display device according to claim 9, wherein
the cover member has a recess portion storing the circuit board, and
the circuit board mounted on the substrate mounting region on the rear surface of the substrate mounting member is covered with the cover member in a state stored in the recess portion of the cover member.

13. The display device according to claim 9, wherein
the non-substrate-mounting region on the rear surface of the substrate mounting member is provided on the rear surface of the substrate mounting member to surround the periphery of the substrate mounting region.

14. The display device according to claim 9, wherein
the substrate mounting region on the rear surface of the substrate mounting member is formed in a concave shape, and
the cover member is mounted to fit into the substrate mounting region of the concave shape.

15. The display device according to claim 9, further comprising a frame-shaped front housing having an inner peripheral surface approaching an outer peripheral surface of the substrate mounting member constituting the rear housing and covering the periphery of the outer peripheral surface.

16. The display device according to claim 9, further comprising a speaker, wherein
the cover member is arranged to also cover the speaker in addition to the circuit board while exposing the non-substrate-mounting region.

17. The display device according to claim 9, wherein
the cover member is configured to be mountable on the display module of a different size in a common magnitude.

18. A television device comprising:
a receiving portion capable of receiving television broadcasting;
a display module including a backlight source and a substrate mounting member covering the backlight source and capable of displaying television broadcasting; and
a cover member arranged to partially cover the rear surface of the substrate mounting member and to expose a region in the periphery of at least an outer peripheral portion of the rear surface of the substrate mounting member, wherein
the substrate mounting member has a bottom surface portion and a side surface portion, while a corner portion of the outer peripheral portion formed by the side surface portion of the substrate mounting member has such a shape that adjacent ones of the side surface portion are bonded to each other without a clearance, and
the exposed region is configured as a heat radiation portion radiating heat of at least a circuit board mounted on the substrate mounting member outward, thereby improving heat transfer properties of the exposed region compared to a region covered by the cover member.

19. The television device according to claim 18, wherein
an outer peripheral surface of the side surface portion on the corner portion of the substrate mounting member is so formed that adjacent ones of the side surface portion are bonded to each other without a clearance to have a round shape.

* * * * *